Nov. 24, 1936.　　　　E. PICK　　　　2,061,715
WATER TREATING APPARATUS
Filed Feb. 26, 1935　　　3 Sheets-Sheet 1
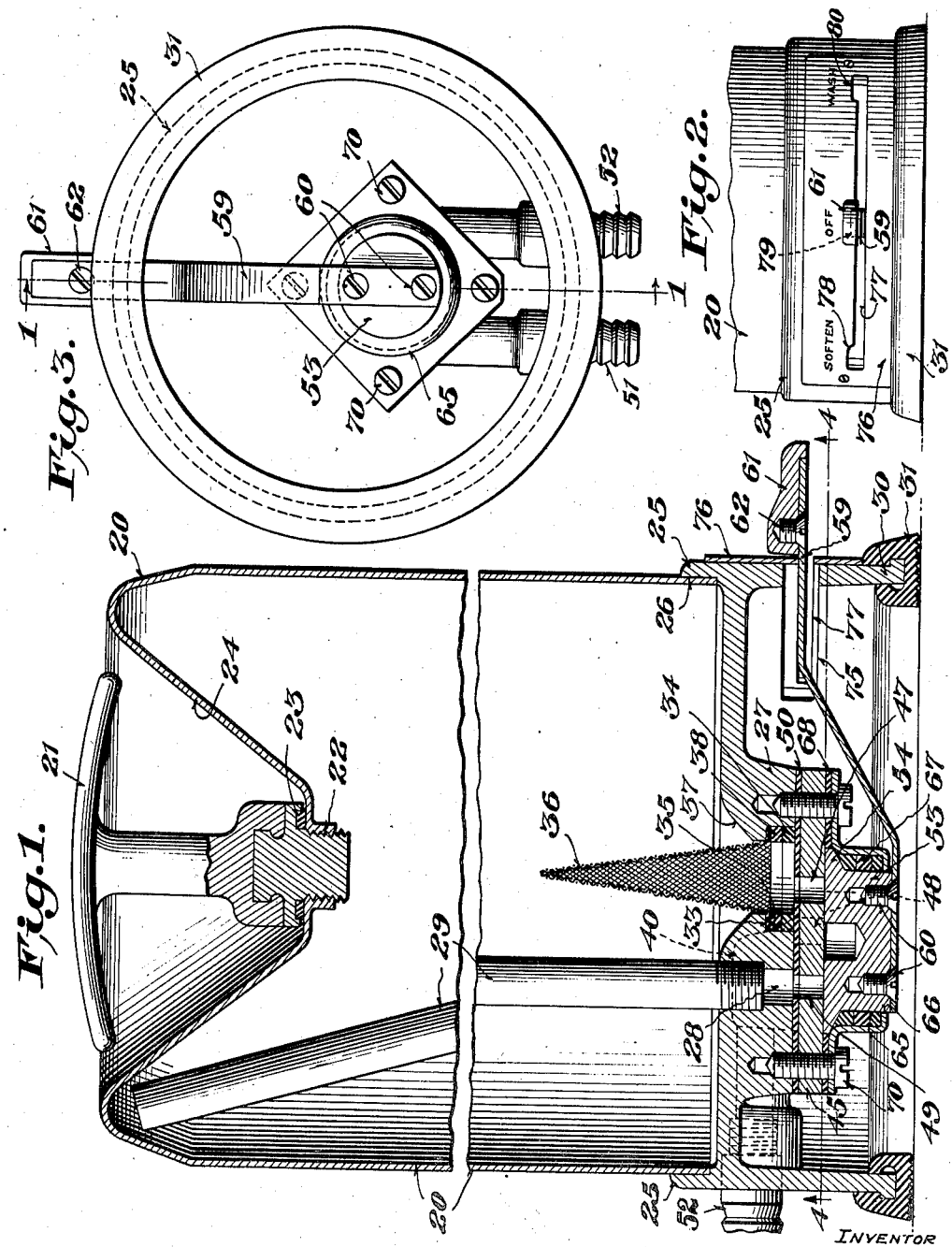
INVENTOR
Eric Pick,
By K. P. McElroy
Attorney

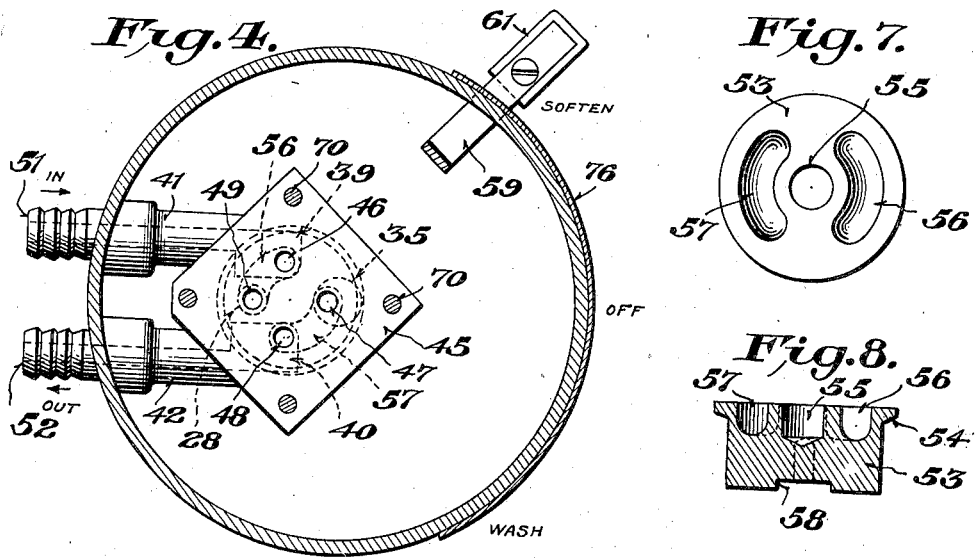
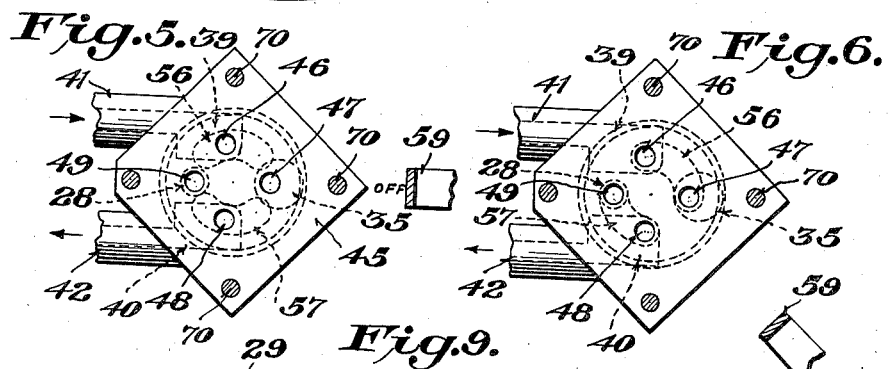
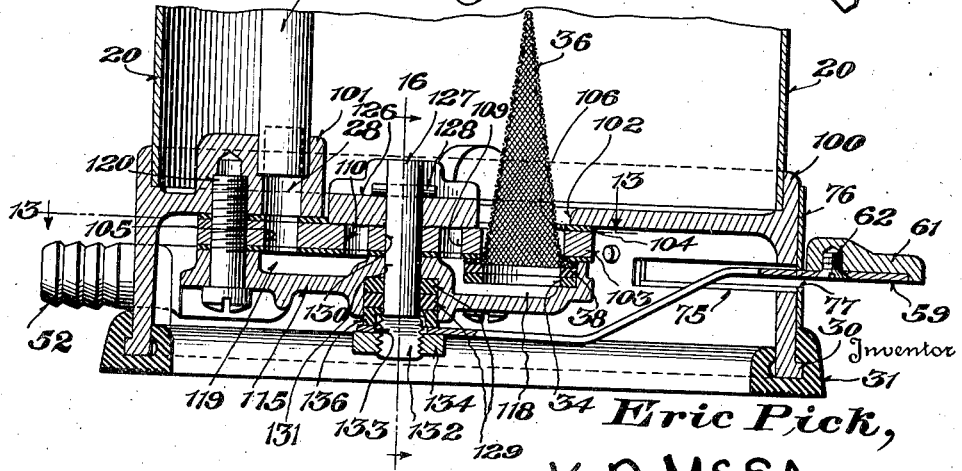

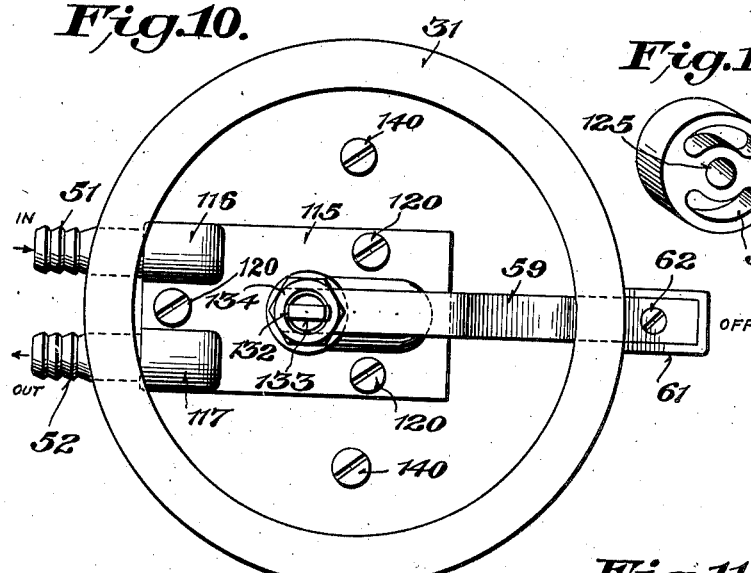
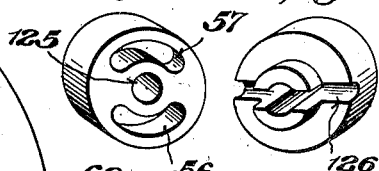
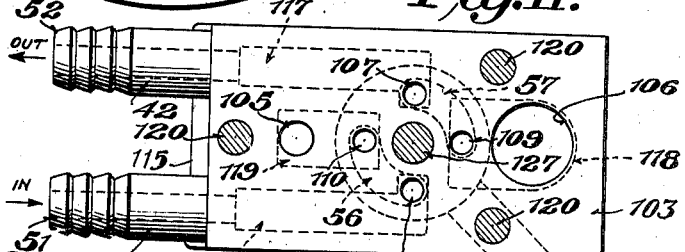
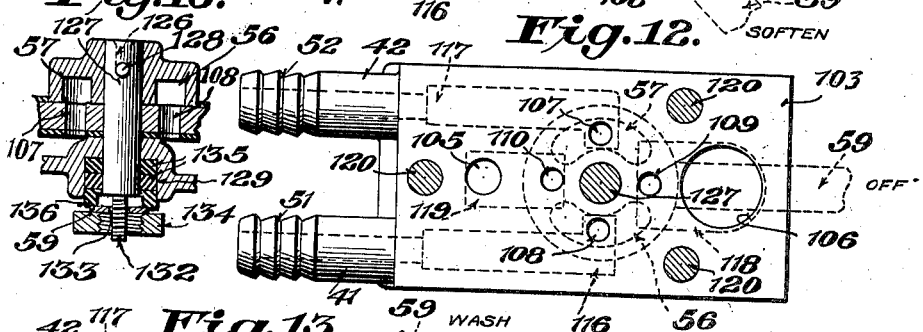
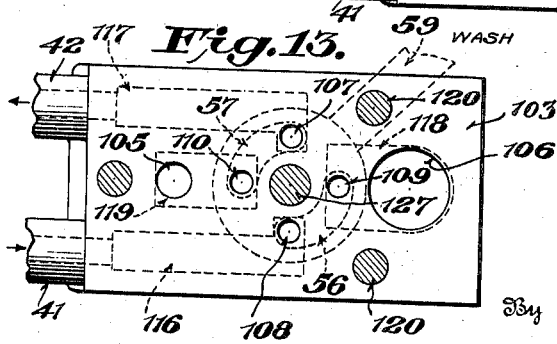

Patented Nov. 24, 1936

2,061,715

UNITED STATES PATENT OFFICE 2,061,715

WATER TREATING APPARATUS

Eric Pick, New York, N. Y., assignor to The Permutit Company, New York, N. Y., a corporation of Delaware Application February 26, 1935, Serial No. 8,377

5 Claims. (Cl. 210—24)

This invention relates to water treating apparatus: and it comprises improved portable water treating apparatus having a container for zeolites or filtering material, a closure at one end of the container, a distributor in the closure, a conduit extending from the closure end of the container toward the opposite end of the container inside thereof, a rotary multiway valve in the closure and comprising a stator and a rotor, the rotor and stator having cooperating faces, the rotor axis being substantially vertical, the stator having inlet and outlet connections and ports in its face communicating with said connections and other ports connecting with passages leading to the distributor and to the conduit, an operating lever connected to the rotor and extending laterally outside the container and supporting means for the container and closure extending below the valve; all as more fully hereinafter set forth and as claimed.

Portable water softening or filtering apparatus for light or temporary service, such as in laboratory, household or barber shop use, has requirements to be met which are somewhat different from those of large, permanent installations under the charge of skilled operators. Softeners of this type must be capable of being readily carried around and attached to the source of raw water for use. They must be cheap in original cost and upkeep and they must be reliable and simple to operate. Insofar as they fail to meet these requirements, their utility is decreased.

The present invention comprises an improved portable water treating apparatus which has these desirable qualities; in which these objects are achieved. It has all necessary fittings and adjustments for adequate control of the various steps in filtering or water softening operations. No essential feature of water treating apparatus is left out. The apparatus is provided with control means simply and readily manipulated by even unskilled operators. The device is compact, rugged, dependable, simple and sightly.

The invention will be described with particular reference to base exchange water softening, although it is equally well adaptable to filtering, utilizing a body of activated carbon, sand, etc. The apparatus comprises a container shell for water treating material and a closure member therefor, usually separate and usually forming the base of the apparatus, and a compact rotary multiway valve in the closure member. The valve is usually of the flat disk type and it is arranged with the axis of rotation vertical, so as to get the greatest possible compactness. The rotor and the stator have cooperating ported faces in communication with channels in both members. There are four stator ports, in respective communication with inlet and outlet connections and the top and bottom of the softener. An operating lever attached to the rotor extends laterally outside the apparatus, for manipulating the valve. With this arrangement, a long valve lever arm is provided without increasing the size of the apparatus. In one embodiment, the valve rotor extends into the casing and is exposed therein. In another embodiment, the rotor is below the casing and is retained by simplified combined packing and retaining means.

In the accompanying drawings are shown, more or less diagrammatically, two examples of specific embodiments of apparatus within the invention.

In the drawings, Fig. 1 is a view in central vertical section of one embodiment of the apparatus;

Fig. 2 is a view in elevation of the base portion of the apparatus of Fig. 1;

Fig. 3 is a plan view of the bottom of this modification, looking upwards;

Fig. 4 is a sectional view taken along line 4—4 of Fig. 1;

Figs. 5 and 6 are diagrammatic views of the valve, corresponding to a portion of Fig. 4, showing two valve positions;

Figs. 7 and 8 are views of the valve rotor of Figs. 1 to 5 in plan and section;

Fig. 9 is a view in vertical section of the base portion of a second or modified form of apparatus embodiment;

Fig. 10 is a bottom plan view of the apparatus of Fig. 9, looking upward;

Figs. 11, 12 and 13 are detail views of the valve stator plate of the apparatus of Fig. 9, to show the valve in three different positions;

Figs. 14 and 15 are perspective views of the valve rotor of this modification; and Fig. 16 is a view partly in elevation and partly in section taken along line 16—16 of Fig. 9.

In the drawings, in which like reference characters indicate like parts, Figs. 1 to 8 relate to one modification of apparatus within the invention. The apparatus has a container shell 20 advantageously of thin drawn metal and provided with a handle plug 21 threadedly engaging a threaded flange inlet 22, as shown. A gasket 23 is provided for the plug. The plug serves as a combined detachable closure and carrying means. The top portion of the shell is recessed in conical or funnel shape as at 24. The shell is provided with a base of aluminum, iron, laminated plastic material or the like, shown as a casting 25 having an annular recess 26 in which the shell 20 is held as by soldering or brazing. The shell can be of any convenient height. The base has a lower rim 30 provided with a rubber guard 31, as shown. In the lower part of the base casting is mounted the valve. The valve comprises a stator extension portion 27 in the base provided with a passage 28 and a conduit 29 in communication with the passage and extending upwardly to near the top of the softener, adjacent the upper rim of the funnel, as shown. The base also has a bore 35 in which is positioned a distributor 36 shown as a cone of wire mesh. The base has a funnel-like depression 37 surrounding the cone. The flanged base 33 of the cone is held in place by a metal ring 34 and a gasket 38. The base is also formed with two passages 39 and 40 in respective communication with an inlet conduit connection 41 and an outlet conduit connection 42, as shown (Fig. 4). A port plate 45, advantageously of hard rubber, synthetic plastic or the like, is mounted over the stator portion, having four ports 46, 47, 48 and 49 delivering to passages 39, 35, 40 and 28, respectively. A correspondingly ported gasket 50 is positioned between the port plate and the stator portion (Fig. 1). The inlet and outlet conduit connections 41 and 42 are provided with grooved nipples 51 and 52 for attachment of hoses.

The valve rotor is in the form of a short cylinder 53 provided with a frustoconical flange 54, a central cylindrical cavity 55 extending part way through the rotor, arcuate channels 56 and 57, and a groove 58 in which is fixed a valve operating lever 59, by means of screws 60 threaded into the rotor. The valve lever is of more or less springy material and extends laterally outside the softener base. The outer end has a handle 61 screwed thereon by a screw 62.

The rotor is retained against the port plate by a flanged cylindrical cap 65, provided with a bore 66 closely fitting the rotor. Annular packing 67 between the cap and the rotor provides a tight seal in all valve positions. An appropriately ported gasket 68 is interposed between the flange of the cap and the port plate. The cap, the port plate and gaskets 50 and 68 are all held tightly to the base by means of screws 70, threaded into the base. This arrangement makes for easy assembly and disassembly of the valve combination.

The valve is shiftable angularly to three different positions, by means of the lever 59. One position makes connections for the softening operation. A second position makes connections for backwashing, and in a third position all flows are shut off to and from the apparatus. The base 25 is slotted as at 75 and has an index or guard plate 76 having a slot 77 corresponding to slot 75 and three detents 78, 79 and 80, respectively corresponding to softening, off and wash positions of the valve. The valve lever slides in slot 77 and is retained in position by the detents, the springiness of the lever tending to force it upwards against the upper edge of the slot.

The operation of the valve is clearly shown in Figs. 4 to 6. Fig. 4 shows the apparatus set for the softening operation. In this position the valve lever is moved to the softening position, as indicated in Fig. 4. In this position the arcuate channels 56 and 57 in the rotor, indicated in dotted lines, interconnect ports 46 and 49, and 47 and 48, respectively. Water flows in through inlet 41, passage 39 in the stator, port plate port 46, rotor channel 56, port plate port 49, stator passage 28 and thence to the top of the softener through conduit 29. The water flows down through a bed of zeolites, not shown, in the container, becoming softened by base exchange, and flows out through distributor 36, bore 35, port plate port 47, channel 57, port plate port 48, passage 40, outlet conduit 42 and nipple 52, to a point of use.

In the wash position (Fig. 6) the arcuate channels in the rotor make connections just the reverse of those for the softening operation. A strong flow of water flows in through nipple 51, inlet conduit 41, passage 39, port plate port 46, channel 56, port plate port 47, bore 35 and the distributor 36, to the bottom of the bed of zeolites or filtering material in the container, the flow rising to the top of the container whence it passes down through conduit 29, passage 28, port plate port 49, channel 57, port plate port 48 and out through passage 40, outlet conduit 42 and nipple 52, to waste.

Fig. 5 shows the valve in the off position. The valve lever is shown in this angular position in Figs. 1, 2 and 5. In this position the rotor cuts off all flows to and from the softener; port plate ports 47 and 49, leading to the distributor and the conduit, respectively, being covered.

This modification presents many advantages in construction and operation. The device is especially compact. The valve parts are discoid and horizontal, the axis being vertical. The valve lever extends laterally outside the base, which not only makes for compactness but also affords a long lever arm for the valve. This makes it possible to use tighter packing for the valve while still not having it hard to turn. The device is readily connected and disconnected. Ordinary rubber hose connections are used. It is simple to operate. There are only three valve positions and there is no possibility of improper valve setting, which often happens when a nest of valves is used.

The modified embodiment of the invention shown in Figs. 9 to 15 has advantages in certain relations. This modification has a casing shell 20 and top closure which are like those in the apparatus of Figs. 1 to 8 and of which only the lower portion is shown in Fig. 9. The base 100 of this device is generally similar in outside appearance to that of Figs. 1 to 8, but in this design the stator is in part detachable. The base is provided with a lug 101 carrying the conduit 29 and having a communicating passage 28, and is provided with an oval opening 102 surrounding the valve rotor and the distributor as described below. The ported stator comprises a port plate 103 of hard rubber, formica or the like, abutting the base with an interposed gasket 104 and provided with a port 105 delivering to passage 28 and conduit 29, a large port 106, receiving the distributor 36, and ports 107, 108, 109 and 110 arranged about a circle, as shown. Below the port plate is positioned a stator plate 115 formed with a channel 116 connecting the inlet nipple 51 with port plate port 108 and with a channel 117 connecting outlet nipple 52 with port plate port 107. The stator plate also has a passage 118 connecting port plate port 109 with port 106; and a passage 119 connecting port plate port 110 with port plate port 105 and thence with the conduit 29. The stator plate carries the inlet and outlet nipples and is fastened to the base proper by means of three screws 120 threaded into the base. The nipples project beyond the base through cut-out openings (not shown) in the base. The stator plate retains the distributor 36 in place, through gasket 38 and metal ring 34.

In this modification the rotor extends into the container and is exposed therein; a remarkably simple and economical construction. The rotor is a discoid element provided with arcuate channels 56 and 57, a central bore 125 extending through it, and a lateral groove 126. The rotor is mounted on a valve shaft 127 by means of a pin 128 passing through the valve shaft and resting in groove 126. The lower end of the valve shaft extends through a bore 130 in the port plate and a bore 131 having a widened cylindrical cavity 129, in the stator plate. The lower end has a threaded tip or lug 132 (Figs. 9 and 16). The tip or lug 132 is formed by threading the cylindrical end of the shaft 127 and then milling away the end portions on two sides. The valve lever is slotted as at 133, and is slipped over lug 132, whereby the lever turns the valve shaft. The lever is retained by a knurled nut 134 engaging the threads on lug 132. Packing rings 135 are interposed between the stator plate and the shaft, and a ring 136 is provided between the valve lever and the packing rings. Ring 136 fits closely in cavity 129 and surrounds the lug 132, but is not fixed thereto. Ring 136 can move axially with respect to the shaft and with respect to the stator plate. Tightening of nut 134 simultaneously tightens the rotor against the port plate, and tightens the packing.

The valve is manipulated from the outside as described in connection with the apparatus of Figs. 1 to 8. The functioning of the valve is generally similar and will be clear from a consideration of Figs. 11 to 13, which show the valve in positions of softening, off, and backwashing, respectively. Figs. 11 to 13 are diagrammatic views looking down upon the port plate, the rotor being indicated in dotted lines.

Screws 140 are provided in the base, for attaching the softener to a bracket (not shown) for attachment to a wall or to domestic washing machines or the like.

In the softening position (Fig. 11) raw water flows in through nipple 51, channel 116, port plate port 108, arcuate channel 56 of the rotor, port plate port 110, channel 119, port plate port 105, passage 28 and conduit 29 to the top of the softener. The water flows down through the bed of zeolites (not shown) and softened water issues through distributor 36, stator plate passage 118, port plate port 109, arcuate channel 57, channel 117 and outlet 52, which is connected to service.

In the backwash position (Fig. 13) the flows are reversed. Water flows in through inlet nipple 51, channel 116, port plate port 108, rotor channel 56, port plate port 109, channel 118 and the distributor 36, to the bottom of the zeolite bed. The backwash water flows upward through the bed, passes outward through conduit 29, passage 28, port plate port 105, channel 119, port plate port 110, rotor channel 57, port plate port 107, channel 117 and outlet nipple 52 to waste.

Fig. 12 shows the off position, the rotor in this position closing off port plates 110 and 109 leading to conduit 29 and distributor 36, respectively.

This embodiment is equally desirable from a practical point of view. It is cheap and simple to make and reliable in use. It is compact, sightly and does not get out of order, and can be manipulated by inexperienced persons.

In one convenient method of regenerating, with either form of softener the valve is first turned to wash position for backwashing zeolites when they become clogged with impurities. A strong flow of water is directed up through the bed in the manner described, cleansing it. The valve is then turned back to service position, the raw water supply being shut off independently at the faucet and the top closure plug is removed and water is drawn off from the softener until the water level is several inches below the top opening. Then a quantity of dry salt or prepared brine is poured into the container, the funnel-like top portion assisting in this operation, and the plug is replaced. Next, a small amount of water is displaced from the container by turning on the hard water supply to insure that the zeolite body is filled with brine. The valve is then turned to off position and the softener left to stand, to allow regenerating to take place. Finally the valve is turned to softening position, the liquid standing in the softener is flushed out and the apparatus is once more ready for service.

In using the apparatus as a filter, a body of sand, activated carbon or other filtering material is used in the container. The valve then functions to make connections for filtering, washing, and "off".

In either modification of the described water treating apparatus the base can be of any suitable material, such as brass or bronze and can be formed by casting, forging, molding or other appropriate manner.

What I claim is:—

1. Water treating apparatus comprising a container for water treating material, a distributor near one end of the container and a conduit extending from that end of the container toward the other end of the container inside thereof, a rotary multiway valve on the end of the container having the distributor and comprising a stator and a rotor, the rotor and stator having cooperating faces, the rotor axis being substantially vertical, the stator having laterally extending inlet and outlet connections and ports in the stator face in communication with said connections and other ports in the stator face in communication with the distributor and the conduit, a horizontally shiftable, springy operating lever connected to the rotor and extended laterally beyond the side wall of the container, the outside of the container being provided with a horizontal slot and angularly spaced detent means, the lever cooperating with the slot and the detent means to be retained in definite angular positions, and supporting means for the container.

2. Water treating apparatus comprising a container for water treating material, a distributor near the bottom of the container and a conduit extending from the bottom toward the top of the container inside thereof, a rotary multiway valve on the bottom of the container and comprising a stator and a cylindrical rotor, the rotor and stator having cooperating faces, the rotor being below the stator face and having a substantially vertical axis, a closely fitting cylindrical shell attached to the base and retaining the rotor to the stator and providing sealing means for the rotor, the stator having laterally extending inlet and outlet connections and ports in the stator face in communication with said connections and other ports in the stator face in communication with the distributor and the conduit, a horizontally shiftable operating lever connected to the rotor and extended laterally beyond the side of the container, and supporting means for the bottom of the container extending below the valve.

3. Improved water treating apparatus comprising a vertical cylindrical container shell, a supporting base therefor of flat discoid shape with a slotted, depending flange and cooperating with the container shell to form an enclosed chamber for water treating material, a substantially centrally located distributor and a vertically extending conduit mounted in the base, the base having an eccentrically mounted valve stator nearer one side than the other and having a face with ports therein leading to the distributor and the conduit, a channeled valve rotor coacting with the stator and having the axis vertical, means for pressing the rotor against the stator, liquid connections for the valve extending through the flange, and a long operating lever operatively attached to the rotor and extending out through the flange slot on the side of the base flange which is farthest from the stator so that great leverage is obtained on the rotor, the flange concealing said valve.

4. Improved water treating apparatus comprising a vertical cylindrical container shell, a supporting base therefor of flat discoid shape and cooperating with the shell to form an enclosed chamber for water treating material, a vertically extending conduit mounted in the base, the base having a central upwardly flaring depressed opening, a distributor mounted therein and extending into the container shell, means for holding the distributor in the depression, a downwardly extending, slotted supporting flange on the base, the base having a valve stator face therein provided with ports leading to the distributor and the conduit, a channeled valve rotor coacting with said face and having its axis vertical, means for pressing the rotor against the stator face, liquid connections for said valve elements extending out through the flange, and a long operating lever extending through the flange slot so that great leverage is obtained on the rotor.

5. Improved water treating apparatus comprising a vertical cylindrical container shell, a supporting base therefor of flat discoid shape and cooperating therewith to form an enclosed chamber for water treating material, a slotted supporting flange depending from the base, the base having a stator face provided with openings delivering to the interior of the container, a conduit mounted adjacent one of said openings in liquid communication therewith and extending into the container up to near the top thereof, a distributor mounted in another of said openings and extending into the lower portion of the container, a channeled valve rotor coacting with the stator face and having its axis vertical, means for pressing the rotor against the stator face, the stator having ports communicating with the conduit and distributor openings and cooperating with the rotor in different positions to establish different flows through the apparatus, liquid connections for the valve extending out through the flange and a long operating lever extending through the flange slot so that great leverage is obtained on the rotor.

ERIC PICK.